Jan. 14, 1930.  M. CARTER  1,743,425
METHOD OF MAKING INFLATABLE RUBBER BALLS
Filed Sept. 25, 1928   2 Sheets-Sheet 1
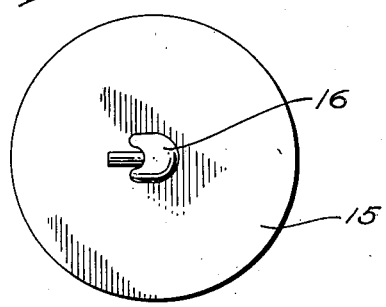
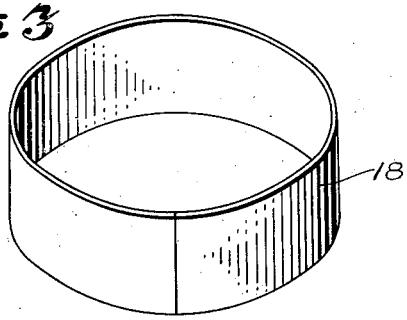
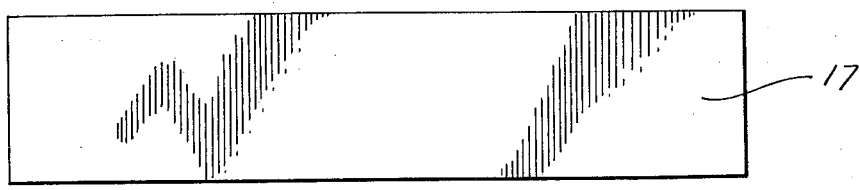
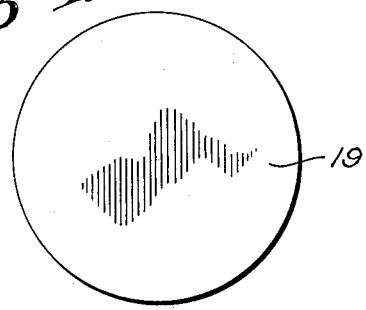
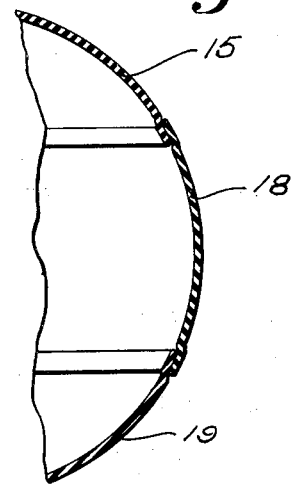
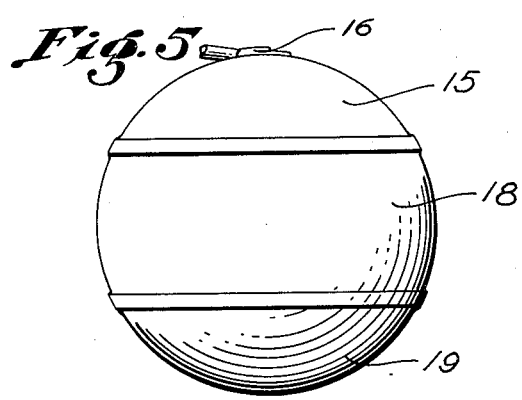
INVENTOR.
Mitchell Carter.
BY Nestall and Wallace
ATTORNEYS Jan. 14, 1930. M. CARTER 1,743,425
METHOD OF MAKING INFLATABLE RUBBER BALLS
Filed Sept. 25, 1928 2 Sheets-Sheet 2
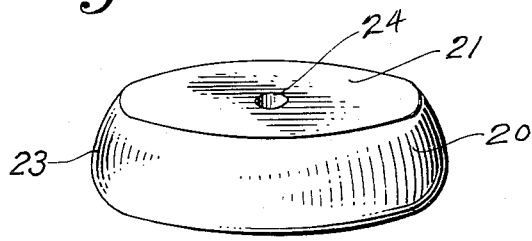
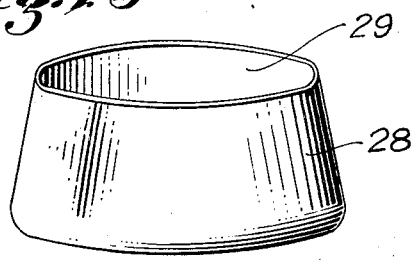
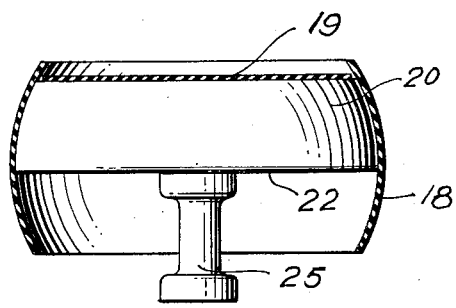
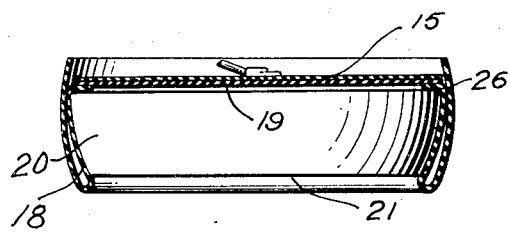
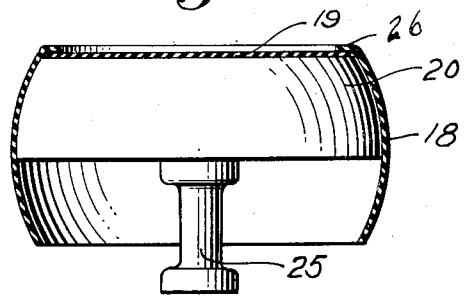
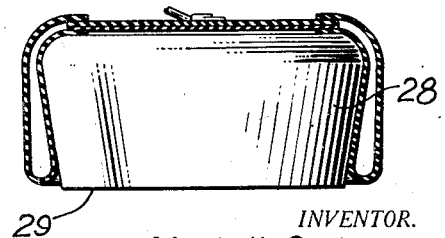
INVENTOR.
Mitchell Carter.
BY Nestall and Wallace
ATTORNEYS Patented Jan. 14, 1930

1,743,425

UNITED STATES PATENT OFFICE

MITCHELL CARTER, OF LOS ANGELES, CALIFORNIA

METHOD OF MAKING INFLATABLE RUBBER BALLS

Application filed September 25, 1928. Serial No. 308,187.

This invention relates to a process of making inflatable balls from sheets of elastic material. Heretofore, it has been the practice to mould such balls or to build them up of gores of material cemented or vulcanized at their adjoining edges. For reasons of economy in construction and of perfection in the material employed, it is advantageous to construct such balls by assembly of segments. To form such balls, a multiplicity of operations in formation of the seams or joints is required. This results in a relatively high labor cost and a relatively long time for the completion of a ball. I have found it advantageous to form balls of rubber segments of either cured or uncured rubber. The formed balls, if of uncured rubber, are then cured to produce the final product. Such mode of procedure has been economical, satisfactory and results in a strong, durable and perfect ball. However, the present invention relates to the formation of balls having a peculiar deflated shape and a minimum of segments and seams, contributing to ease and economy of manufacture, durability and distinctiveness in the design of the ball.

To this end, the invention resides in the combination of any or all of the following features: employing an endless band and end discs, holding the band in dilated form, uniting an end disc to one end of said band, telescoping the band upon itself, dilating the open end, uniting another end disc to the free edge of the open edge of the band; expanding or stretching the band instead of merely dilating it; initially forming the ball of uncured rubber and then curing the same; and curing the initially formed ball while the latter is maintained telescoped and in dilated condition.

Apparatus for carrying out the steps of the invention are shown in the accompanying drawing, in which:

Figure 1 is a plan view of the top disc; Fig. 2 is a plan view of the strip from which the endless band is formed; Fig. 3 is a perspective view of the formed endless band; Fig. 4 is a plan view of the bottom disc; Fig. 5 is an elevation of a completed ball in inflated condition; Fig. 6 is a section showing a fragment of the ball; Fig. 7 is a perspective view of a form used in making the seams; Fig. 8 is an elevation of the form with a band and disc shown thereon in section preparatory to uniting the first disc and the band; Fig. 9 is a view similar to Fig. 8, showing the seam complete; Fig. 10 is a view similar to Fig. 8, showing the form inverted and the band telescoped with the second disc in place; Fig. 11 is a view similar to Fig. 10, showing the seam completed; Fig. 12 is a transverse sectional view through a curing form with the initially formed ball in telescoped condition mounted thereon; and Fig. 13 is a perspective view of the curing form.

Referring with more particularity to the drawings, the ball is formed of three segments. A top disc 15 is stamped from uncured rubber and is shown provided with a valve structure 16 for inflation and deflation. However, the valve is not completely assembled on the disc until the segments are assembled, an inflation tube being placed in position before the disc is placed in assembly position. The intermediate portion of the ball is preferably made from a strip of uncured rubber, indicated by 17. The ends of the band are butted and united. The completed band is indicated by 18. The bottom disc is likewise preferably made of uncured rubber. The seams between the band and disc are lapped and the dimensions of the segments should be such as to accommodate the parts taking into account shrinkage and overlapping.

A wooden form 20 for supporting the segments while making the seams may be employed. This form is circular in transverse section having an upper base 21 of less diameter than the lower base 22 and with a curved side wall marked 23. A hole 24 extends through the form and serves to receive a pin on a supporting member 25 so that the form may be reversed. However, the support forms no part of the invention. The least diameter of the form should be a little greater than the internal diameter of the band when the latter is spread around the form so as to cause an expansion of the band.

In initially forming the ball, the form 20 is placed with its small diameter uppermost. The band is allowed to project above the upper face of the form sufficient to overlap a disc 19 which is placed thereon. The cement is then placed either on the band at its projecting edge, upon its corresponding portion of the disc, or both, and the band pressed downwardly to form a lap seam. This seam is then "stitched" by pressure preferably exerted by a roller which is caused to ride thereover. When the cement has thoroughly dried, the band and its disc is stripped from the form and turned inside out, and the form inverted with the base of greater diameter uppermost, as shown in Fig. 10. The partially formed ball is then stretched over the form 20 and the band telescoped upon itself with the free edge projecting above the seam 26. The disc 15, with its inflation tube in position, is then placed in position, as shown in Fig. 10, and a seam formed and cemented as indicated by 27. A cover for the inflation tube is then attached. When the cement has thoroughly dried, the initially formed ball is removed from form 20. If the ball is initially made of cured rubber, the product is then complete. If the ball is made of uncured rubber, it may be placed in a mould, inflated and cured. Another method of curing is as follows:

A curing form 28 is next employed to maintain the initially formed ball in telescoped condition while being cured. This form marked 28 is preferably a shell of sheet metal such as aluminum, having its open end 29 of less diameter than the closed end and with substantially straight side walls. Its dimensions are such as to expand the ball, which is placed thereon in telescoped condition, as shown in Fig. 12. The ball may then be cured in open steam or hot water. In making the ball, the valve is placed in position after the end discs have been united to the band. By expanding the ball during the forming operation, smooth seams are assured. Furthermore, the segments are maintained in proper position while the seam is being formed and the operator is enabled to obtain a proper gage in making the seam.

Balls may be formed by initially using cured rubber, thus doing away with the curing step. The invention resides broadly in the mode of procedure in assembling the segments into a complete ball.

What I claim is:

1. The process of forming an inflatable article of elastic material from end discs and an endless band comprising dilating said band at one end, inserting into the dilated end one of said discs, uniting the circumferential edge of the inserted disc and the dilated edge of said band, telescoping said band upon itself with the open end outward, inserting a second disc within the open end of said band, and uniting the free edge of said band and the circumferential edge of the second disc.

2. The process of forming an inflatable article of elastic material from end discs and an endless band comprising dilating said band at one end, inserting into the dilated end and transverse thereof one of said discs so that the dilating edge projects above the plane of the inserted disc, lapping said disc and the dilated edge of said band, uniting the lapped edges, telescoping said band upon itself so that the edge of the open end projects beyond the inserted disc, dilating the open end of said band, inserting another disc in the open end of said band, lapping said disc and the free edge of said band, and uniting the edges so lapped.

3. The process of forming an inflatable article of elastic material from end discs and an endless band comprising expanding said band with one end of less diameter than the other, inserting one of said discs within the larger expanded end and transverse thereof so that the edge of said expanded edge projects beyond the plane of the inserted disc, lapping the projecting end over the inserted disc and uniting the same, telescoping said band upon itself so that the edge of the open end projects beyond the attached disc, expanding said band at the open end to a diameter greater than the first mentioned expansion, inserting a disc in said open end, lapping the edge of said open end and said last mentioned disc, and uniting the same.

4. The process of forming an inflatable article of rubber from an uncured end disc and an uncured endless band comprising dilating said band at one end, inserting into the dilated end one of said discs, uniting the circumferential edge of the inserted disc and the dilated edge of said band, telescoping said band upon itself with the open end outward, inserting a circular disc within the open end of said band, uniting the free edge of said band and the circumferential edge of the second disc, and curing the article so formed.

5. The process of forming an inflatable article of rubber from uncured end discs and an initially uncured endless band comprising dilating said band at one end, inserting into the dilated end and transverse thereof one of said discs so that the dilated edge projects above the plane of the inserted disc, lapping said disc and the dilated edge of said band, uniting the lapped edges, telescoping said band upon itself so that the edge of the open end projects beyond the inserted disc, dilating the open end of said band, inserting another disc in the open end of said band, lapping said disc with the free edge of said band, uniting the edges so lapped, and curing the article so formed.

6. The process of forming an inflatable article of rubber from uncured end discs and an uncured endless band comprising expanding said band at one end, inserting one of said discs within the expanded end and transverse thereof so that the edge of said expanded end projects beyond the plane of the inserted disc, lapping the projecting end over the inserted disc and uniting the same, telescoping said band upon itself so that the edge of the open end projects beyond the attached disc, expanding said band at the open end to a diameter greater than the first mentioned expansion, inserting a disc in said open end, lapping the edge of said open end and said last mentioned disc, uniting the same, and curing the article so formed.

7. The process of forming an inflatable article of rubber from uncured end discs and an uncured endless band comprising dilating said band at one end, inserting into the dilated end one of said discs, uniting the circumferential edge of the inserted disc and the dilated edge of said band, telescoping said band upon itself with the open end outward, inserting a second disc in the open end of said band, uniting the free edge of said band and the circumferential edge of the second disc, maintaining the initially formed article in dilated telescoped position, and curing said initially formed article while so maintained.

8. The process of forming an article of rubber from uncured end discs and an uncured endless band comprising dilating said band at one end, inserting into the dilated end and transverse thereof one of said discs so that the dilated edge projects above the plane of the inserted disc, lapping said discs and the dilated edge of said bands, uniting the lapped edges, telescoping said band upon itself so that the edge of the open end projects beyond the inserted disc, dilating the open end of said band, inserting another disc in the open end of said band, lapping said disc and the free end of said band, uniting the edges so lapped, maintaining the initially formed article in dilated telescoped position, and curing said initially formed article while so maintained.

9. The process of forming an inflatable article of rubber from uncured end discs, and an uncured endless band comprising expanding said band, inserting one of said discs within the expanded end and transverse thereof so that the edge of said expanded end projects beyond the plane of the inserted disc, lapping the projecting end over the inserted disc and uniting the same, telescoping said band upon itself so that the edge of the open end projects beyond the attached disc, expanding said band at the open end to a diameter greater than the first mentioned expansion, inserting another disc in said open end, lapping the edge of said open end of said band and said last mentioned disc, uniting the same, maintaining the initially formed article in telescoped position, and curing said initially formed article while so maintained.

10. The process of forming an inflatable article of elastic material from end discs and an endless band comprising dilating said band at one end, placing one of said discs to close the dilated end, uniting the circumferential edges thereof, telescoping said band upon itself with the open end outward, placing another disc to close said open end, and uniting the free edge of said band and the circumferential edge of said second disc.

11. The process of forming an inflatable article of elastic material from end discs and an endless band comprising expanding said band with one end of less diameter than the other, placing one of said discs to close the larger expanded end, uniting the edges thereof, telescoping said band upon itself, expanding said band at the open end to a diameter greater than the first mentioned expansion, placing a second disc to close said open end, and uniting the edge of said second disc and said band.

12. The process of forming an inflatable article of rubber from end discs and an endless band of uncured rubber comprising dilating said band at one end, positioning one of said discs to close the dilated end, uniting the circumferential edges thereof, telescoping said band upon itself with the open end outward, positioning another disc to close said open end, uniting the free edge of said band and the circumferential edge of said second disc, and curing the article so formed.

In witness that I claim the foregoing 1 have hereunto subscribed my name this 4th day of September, 1928.

MITCHELL CARTER.